United States Patent [19]

Kocsis et al.

[11] Patent Number: 5,300,360
[45] Date of Patent: Apr. 5, 1994

[54] THERMOPLASTIC COMPOSITE ADHESIVE FILM

[75] Inventors: Michael J. Kocsis, Newark; Richard H. Brandon, Pickerington, both of Ohio

[73] Assignee: The Dow Chemical Company, Midland, Mich.

[21] Appl. No.: 817,567

[22] Filed: Jan. 7, 1992

[51] Int. Cl.⁵ .......................... B32B 3/26; B32B 27/08
[52] U.S. Cl. .................................. 428/304.4; 428/331; 428/349; 428/516; 428/520; 427/536
[58] Field of Search ...................... 428/304.4, 349, 516, 428/331, 520

[56] References Cited

U.S. PATENT DOCUMENTS

| | | | |
|---|---|---|---|
| 3,914,521 | 10/1975 | Beatty et al. | 428/463 |
| 5,006,383 | 4/1991 | Achille et al. | 428/349 |
| 5,041,316 | 8/1991 | Parnell et al. | 428/349 |
| 5,110,671 | 5/1992 | Balloni et al. | 428/349 |
| 5,126,197 | 6/1992 | Schinkel et al. | 428/349 |

Primary Examiner—P. C. Sluby

[57] ABSTRACT

A multilayer, multi-component thermoplastic adhesive film particularly useful for bonding automotive interior trim foam-backed fabric to headliner shell materials with shorter headliner fabrication times and excellent deep draw performance.

13 Claims, 1 Drawing Sheet

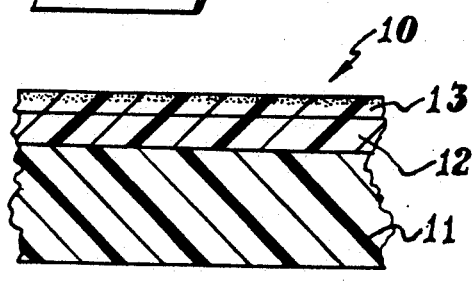
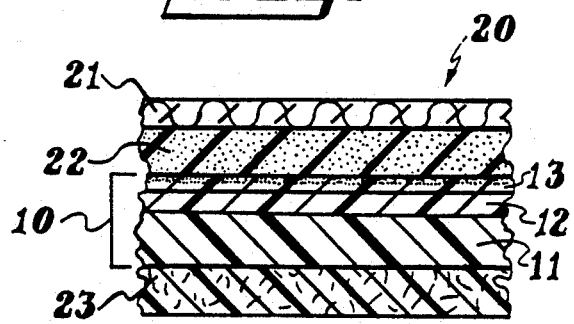
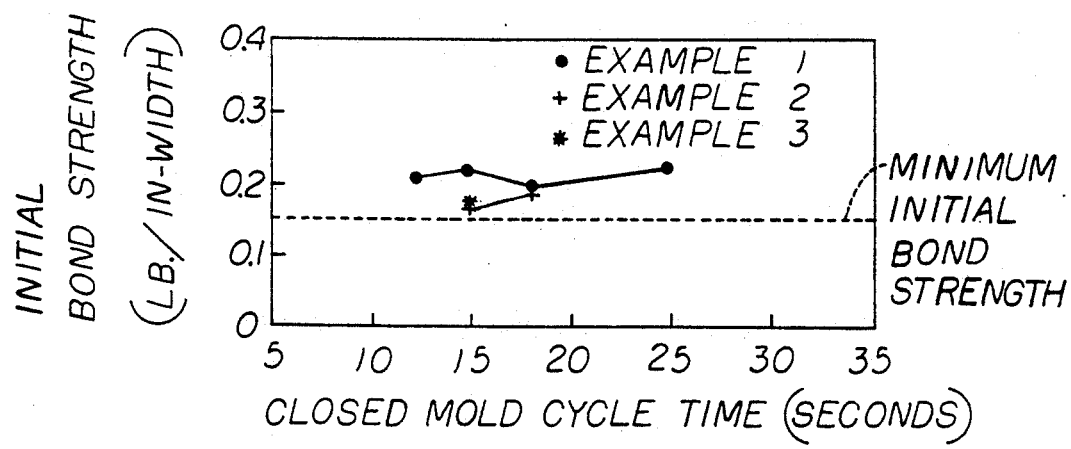
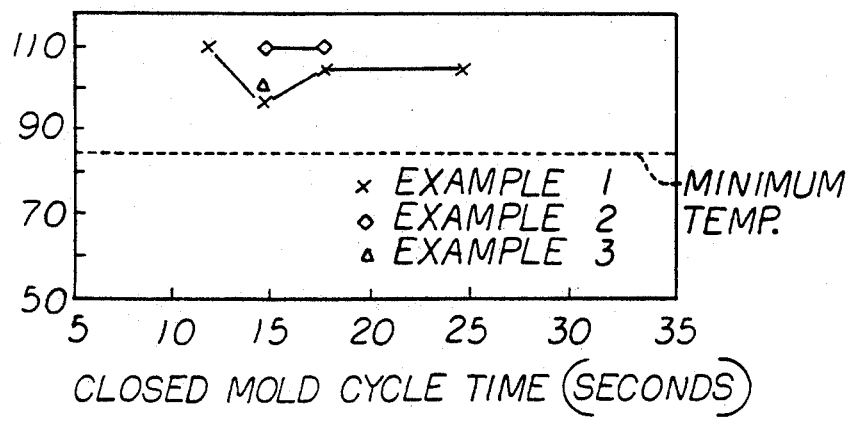

THERMOPLASTIC COMPOSITE ADHESIVE FILM

BACKGROUND OF THE INVENTION

This invention relates to thermoplastic composite films. More particularly, this invention relates to a multilayer thermoplastic composite adhesive film which is particularly useful in automotive interior trim applications, for example, in headliner applications.

The construction of most automotive interior headliners requires an adhesive material to bond headliner components together, e.g., a facing material, such as a polyurethane foam-backed fabric, to a molded headliner insulation shell material such as fiberglass. A typical headliner composite includes a molded, structural shell, an adhesive, a polyurethane foam and a cover material/fabric.

The shell materials include fiberglass, fiberglass reinforced urethane foam, resinated nonwoven materials, polyester fiber composites, paperboard and combinations of paperboard and polyethylene foam or styrene-maleic anhydride (SMA) foam. With most structures, the base substrate is formed in matched metal tool molding operations and trimmed to the specific dimensions. The cover materials typically are constructed of either polyether or polyester urethane foam flame laminated to nylon fabric. Some structures include woven fabrics, needle-punched textiles or thermoplastic elastomer covers without foam backings.

Heretofore, a variety of adhesive systems have been used to carry out the process of permanently bonding the facing material to the molded headliner shell including wet adhesives, both solvent and water-borne, dry powdered adhesives, hot melt adhesives, mechanical fasteners and solid adhesive polymer films.

Wet adhesive systems are typically applied directly on the molded shell by manual or automated spray equipment. The adhesive coated shells are then processed through drying ovens to volatilize the carrier solvent. The cover material is bonded to the shell in a secondary molding operation.

Adhesive films are commonly applied by two processes. First, the adhesive film may be applied by an in-mold technique where the film is placed on a base substrate in the molding process with the cover material. The process may be simplified by mounting a film roll on an unwind stand at the rear of the molding process and unwinding the adhesive film and the cover material in unison.

Second, the adhesive film can be pre-applied to a foam backed fabric via a hot roll or flame lamination process. Adhesive films which are heat activated, thermoplastic adhesive polymers can be bonded to the cover material and reactivated to bond to the base substrate during the molding operation. As a result, the adhesive laminated facing can be placed directly on a base shell in the molding process, eliminating the process of handling the free film. Adhesion values in the range of 0.75 to 1.00 lbs./inch width (3.3 to 4.4N/2.54 centimeters width) are typically achieved during the flame lamination process with polyether and polyester urethane foams and result in a cohesive failure of the foam cells.

A thin gauge (1 to 6 mils (25.4 to 152 microns)) ethylene acrylic acid blown monolayer adhesive film such as Dow Adhesive Film (DAF) 899A commercially available from The Dow Chemical Company, have heretofore been commercially used as a headliner adhesive film for bonding rigid fiberglass shells to polyurethane foam backed fabric. Adhesive selection has typically been based on performance, system economics, and the ability to be processed on existing equipment. The introduction of new base shell materials, designs, regulatory issues, processes and application requirements have placed new demands on the adhesive system. Ideally, the adhesive system must bond to a variety of substrates and cover materials, conform and adhere to molded contours and perform consistently on various processes with improved productivity and quality without creating additional waste disposal or environmental concerns.

Recent development efforts have been focused on designing new adhesive polymer film systems to satisfy the emerging application needs of the interior headliners.

It is therefore desired to provide a new adhesive film for interior headliners fabrication which meets both process and performance requirements while complying with all current headliner specifications.

It is also desired to provide an adhesive film that has the advantages of a non-tack surface for easier handling and the ability to reactivate the adhesive nature of the film by a subsequent heating process.

Some key adhesive film properties desired based on Automotive Original Equipment Manufacturer (OEM) specifications for bonded interior trim, adhesives and adhesive films are initial bond strength (substrate failure) and bond strength after climate simulation testing such as humidity and heat exposure (no loss of properties). A critical application test is the softening point test which measures bond strength under load at elevated temperatures. Another key adhesive need identified in the headliner fabrication process from a manufacturing perspective, includes the ease of handling. To address this need requires designing an adhesive which can be pre-laminated to the cover material to eliminate adhesive handling. Also, the adhesive film must not cause wrinkles in the facing during molding by significantly increasing the stiffness of the cover material. In addition, an adhesive film is required with closed mold cycles of less than 20 seconds to ensure fabrication efficiency. Furthermore, the adhesive film must not create additional waste disposal or environmental concerns. Thus, the film design is limited to materials which do not contain any regulated components.

The industry tends toward new materials and additional contoured shapes require the adhesive to perform on a variety of substrates and molded designs. As a result, there is a need for an adhesive film designed to bond to polyether and polyester urethane foam, unbacked fabrics, and various base headliner substrates. Also, there is a need for a product substrate which is formulated to stretch, conform and adhere on deeply contoured headliners.

SUMMARY OF THE INVENTION

The film of the present invention addresses the needs of the industry by providing a coextruded, multilayer structure, specifically designed for shorter headliner fabrication closed mold cycle times while conforming to original equipment manufacturers adhesive performance specifications. In addition, the film of the present invention exhibits excellent performance in deep draw applications and provides a wrinkle-free article.

One aspect of the present invention is directed to a multilayer, multi-component thermoplastic composite adhesive film comprising:

(a) at least one first layer of a blend of at least a first and second ethylene acyclic acid resin; and (b) at least one second layer adjacent and contiguous to the first layer, the second layer comprising a blend of at least a first and second polyethylene resin.

Another aspect of the present invention is directed to an article having the multilayer, multi-component thermoplastic composite film described above adhered thereto.

The adhesive system of the present invention is particularly and advantageously useful for automotive headliners. The following advantages are obtained using the present invention:

(a) When compared to wet spray systems, the adhesive film of the present invention provides a uniform adhesive coverage to a substrate;

(b) When compared to wet spray systems, the film of the present invention eliminates adhesive waste from overspray and the need to respray parts;

(c) The film of the present invention adheres well to current base headliner shell substrates including polyether and polyester urethane foams;

(d) When compared to other thermoplastic adhesive films, the film of the present invention exhibits a broader range of processing conditions and a wide operating window;

(e) The film of the present invention performs excellently in deep draw-contoured parts;

(f) By employing the film of the present invention, closed mold cycle equivalent to wet adhesive systems can be achieved;

(g) By applying the film of the present invention to a substrate such as foam-backed fabric, the need to handle free film and fabric during headliner fabrication is eliminated;

(h) Wet adhesive storage-handling/disposal issues are eliminated by employing the film of the present invention in applications; and (i) By substituting a wet spray system with the adhesive film of the present invention, headliner fabrication paint savings can be achieved such as increased floor space (or less required) since drying ovens, recovery systems, and spray booths not required; reduced energy consumption since ovens and spray booths are not required; and reduced labor steps, reduced maintenance, and reduced capital cost.

BRIEF DESCRIPTION OF THE DRAWINGS

FIG. 1 is an enlarged partial cross-sectional view showing a film adhesive of the present invention.

FIG. 2 is an enlarged partial cross-sectional view of a headliner composite employing the adhesive film of the present invention.

FIG. 3 is a graphical illustration of the initial bond strength of the film of the present invention.

FIG. 4 is a graphical illustration of the softening point temperature for the film of the present invention.

DETAILED DESCRIPTION OF THE PREFERRED EMBODIMENTS

With reference to FIG. 1, there is shown a multilayer thermoplastic heat activatable adhesive film 10 of the present invention including a first layer 11 and a second layer 12 with said second layer 12 preferably having a treated surface shown as numeral 13. The film shown in FIG. 1 having a treated surface 13 is only a preferred embodiment of the present invention; and either layer 11 or layer 12, alone, can be surface treated, or both layer 11 and layer 12 may be treated, or neither layer 11 nor layer 12 can be surface treated if desired as described below. Thus, in its broadest scope, the film of the present invention comprises a layer 11 and layer 12 with neither layer having a treated surface.

Generally, the first layer 11 is a blend of at least two different comonomers of acrylic acid such as ethylene acrylic acid, ethylene methacrylic acid, ionomers of ethylene methacrylic acid (Surlyn TM polymer trademark of E. I. du Pont de Nemours, Inc.) and the like. The first layer 11 is preferably an ethylene acrylic acid (EAA) resin blend of at least two different EAA resins. The resin blend comprises at least a first and second EAA resin with different melt indexes such that the combination of melt indexes provides the film with a melt tension to withstand the processing conditions of conventional film producing processes and equipment, for example, the blown process or the cast process described in Plastic Films, Chapter 8 "Manufacturing Methods", J. H. Briston, 2nd Edition, George Godwin, 1983.

Generally, the acylic acid functionality content of any of the EAA polymers employed herein is from about 3 percent acrylic acid to about 20 percent acrylic acid and preferably from 9 percent acrylic acid to about 11 percent acrylic acid. At the same functionality of EAA, the first EAA resin preferably has a melt index of from about 10 g/10 minutes to about 30 g/10 minutes and more preferably, from about 18 g/10 minutes to about 24 g/10 minutes. Examples of the first EAA resin employed in the present invention include PRIMACOR TM EAA resin, 3460 and 3440 commercially available from the Dow Chemical Company. The second EAA resin, has a melt index of from less than about 5 g/10 minutes, preferably from about 1 g/10 minutes to about 4 g/10 minutes and more preferably from about 1 g/10 minutes to about 2 g/10 minutes. If a material having more than a melt index of about 5 g/10 minutes is used, melt elasticity of the film can be lost. Examples of the second EAA resin employed in the present invention include EAA 1410 XT, and EAA 1430 also commercially available from The Dow Chemical Company. The melt indexes of the EAA resins are measured at 190° C. by well-known techniques such as described in ASTM D-1238.

Generally, the major component of the first layer blend is the first EAA resin having the higher melt index which is present in the blend in an amount of from about 40 weight percent to about 90 weight percent and preferably from about 60 weight percent to about 80 weight percent. The second EAA resin can be present in the blend at a ratio at from about 60 weight percent to about 10 weight percent, and preferably from about 20 weight percent to about 40 weight percent.

Generally, the second layer 12 is a blend of at least two different polyethylene materials selected from the group comprising ultra linear low density polyethylene, linear low density polyethylene and low density polyethylene. The second layer 12 is preferably a blend of a first and second polyethylene material. The first polyethylene material is preferably, a polyethylene referred to hereinafter as "ultra linear low density polyethylene" ("ULLDPE"). The ULLDPE material is preferably one which has a modulus lower than low density polyethylene and exhibits a bimodal melting point as measured on a differential scanning calorimeter (DSC) by well known techniques and conditions such as by heating a 10 mg sample in a sealed cell from room temperature (about 25° C.) to 150° C. at a rate of about 10° C./minute.

The ULLDPE of the present invention is generally a linear copolymer of ethylene with at least one α-olefin having from 3 to 10 carbon atoms, for example, the ULLDPE may be selected from ethylene-1-propylene, ethylene-1-butene, ethylene-1-pentene, ethylene-4-methyl-1-pentene, ethylene-1-hexene, ethylene-1-heptene, ethylene-1-octene and ethylene-1-decene copolymers, preferably ethylene-1-octene copolymer. An example of a ULLDPE useful in the present invention is ATTANE TM resin (Trademark of The Dow Chemical Company).

Generally, the first polyethylene material has a density of less than about 0.915 g/cm$^3$, preferably from about 0.89 g/cm$^3$ to about 0.915 g/cm$^3$ and more preferably to about 0.912 g/cm$^3$; generally has a melt index of less than about 10 g/10 minutes, preferably from about 0.1 g/10 minutes to about 10 g/10 minutes; more preferably from about 0.5 g/10 minutes to about 5.0 g/10 minutes; and generally has an indicator of molecular weight distribution ($I_{10}/I_2$) of less than about 20, preferably from about 5 to about 20, more preferably from about 7 to about 20 and even more preferably from about 6 to about 18.

The second polyethylene material useful in the second layer 12 is referred to hereinafter as "high pressure low-density polyethylene" ("LDPE"). The LDPE material employed in the present invention is used as a processing aid to add to the melt elasticity to the overall blend layer 12. The LDPE material generally has a density of from about 0.916 g/cm$^3$ to about 0.930 g/cm$^3$, preferably 0.922 g/cm$^3$; and has a melt index of from about 0.1 g/10 minutes to about 10 g/10 minutes. Other processing aids which can be used in the present invention as a substrate for the LDPE include, for example, autoclave Dow LDPE 640 resin with a melt index at less than 2.0 g/10 minutes.

Generally, the major component of the second layer blend is the ULLDPE material which present in the blend in an amount of from about 75 weight percent to about 95 weight percent and preferably from about 80 weight percent to about 90 weight percent. The LDPE material can be present in the blend in a ratio of from about 5 weight percent to about 25 weight percent and preferably from about 10 to about 20 weight percent. Employing a higher amount above 25 weight percent of the LDPE material can increase the modulus of the layer 12 such that it becomes too stiff to thermoform.

Other additives which can be added to the first or second layer may include, for example, colorants, stabilizers, fillers, antioxidants, processing aids, compatibilizers, lubricants, impact modifers and film antiblock additives such as SiO$_2$ or talc (magnesium, silicate hydrate) in amounts ranging from less than about 2 weight percent, from about 0.5 to about 2 weight percent, preferably from about 1 weight percent to about 2 weight percent and from about 0.5 weight percent to about 1.5 weight percent.

The thickness of the film of the present invention will vary depending on the end use of the composite. Normally at least 1.0 mil (25.4 microns) of film is needed to provide the needed adhesion. The maximum thickness of the film that may be used can vary with the type of article produced. Generally, in a headliner application, the overall thickness of the film may be from about 1.0 mil (25.4 microns) to about 6.0 mils (152 microns); preferably from about 1.5 mil (38.1 microns) to about 3.0 mils (76.2 microns).

The thickness of the first layer 11 may be from about 0.75 mil (19 microns) to about 4.5 mils (114 microns); preferably from about 1.1 mil (29 microns) to about 2.3 mil (55 microns). The thickness of the second layer may be from at least about 0.1 mil (2.5 microns) and greater, preferably from about 0.25 mil (6.4 microns) to about 1.5 mil (38.1 microns) and more preferably from about 0.4 mil (10.2 microns) to about 0.8 mil (20.3 microns). In order to maintain the desired properties of the article, the ratio of thickness of the first and second layer should be from about 60% to about 90% for the first layer and preferably from about 70% to about 80% and from about 10% to about 40% for the second layer; preferably from about 20% to about 30%.

Referring to FIG. 1 again, optionally and preferably layer 12 can be treated to form treated surface 13. The treatment of the surface layer 12 to form the treated surface 13 is a conventional surface electrostatic treatment to increase the layer surface energy such as a corona discharge treatment well known in the art (for example, as described in "Corona Treatment of Polymeric Films", Journal of Plastic Film & Sheeting, Vol. 4, July, 1987, pp. 177-188). The surface 13 has a surface energy of from about 38 dynes/cm to about 58 dynes/cm and preferably from about 40 dynes/cm to about 48 dynes/cm as described in ASTM-D2578. In addition, corona treatment "adhesive promoter" treatments can be used such as gas treatments for example Cl$_2$ or F$_2$ reaction with the surface to modify the surface to enhance adhesion.

The film is prepared by coextrusion or laminates of dissimilar layers. Coextrusion is a process whereby two or more polymeric materials are simultaneously brought into contact with one another in juxtaposed relationship at a point prior to the extrusion thereof through a shape forming extrusion die. Lamination is a process whereby two or more products are shaped separately and then later applied together. In lamination, typically a substrate is extruded separately and thereafter a capstock is laminated onto the substrate by pressing the capstock and substrate together between two rolls while the substrate is still hot. The methods of coextrusion and lamination are described in more detailed in *Plastic Films*, Chapter 19, "Lamination", J. H. Briston, 2nd Edition, George Godwin, 1983. Preferably, the film of the present invention is prepared by coextrusion.

In carrying out the process of the present invention, blends of polymers for both layer 11 and layer 12 are premixed and added to different polymer extruders consisting of polymer melting screw and temperature controlled heating zones. The barrel of the extruder consist of several individual heated zones and is heated electrically to temperature setpoints which optimize the melting and forwarding of the polymer blends. For layer 11, the extruder temperature profile may range from about 120° C. to about 200° C., preferably from about 140° C. to about 180° C. For layer 12, the extruder temperature profile may range from about 130° C. to about 240° C., preferably from about 150° C. to about 220° C. The polymer melting screw is rotated at an optimum rate to forward polymer material, melt and mix the material completely but not exceed the limits of the extruder power. For layer 11, the melting screw is rotated to result in a quantity of polymer forwarded to yield, for example, 75% of the resulting film structure. For layer 12, the melting screw is rotated to result in, for example, a 25% contribution to the film structure.

The melted polymer streams enter the heated die through heated transfer pipes. Each polymer stream is separated from the other streams until just prior to exiting the die where they are joined in the melted state. The polymer exits the die (annular for blown, slit for cast) through die lips and is cooled by either air (blown film) or a chilled process roll (cast film.)

In the blown process, a bubble of air is entrapped inside the molten polymer tube and the volume of air is adjusted to result in the desire width requirements of the film. The polymer is cooled by air impinged on the tube and the cooled tube is collapsed by nip rolls. The collapsed film web may then be passed through a corona discharge treatment unit to impart a surface treatment on the outside of the film tube. The film web is then processed through the winder where the film is slit open by various cutting techniques, separated into two webs and wound on film cores. The speed at which the winder pulls film through the process determines the thickness of the final film product.

In the cast process, the polymer melt exiting the die is drawn over a chilled process roll (smooth or patterned surface) and air may be impinged on the cooling film surface. A second roll is sometimes used at this step to impart a distinct pattern (embossing) on the molten film by pressing the film on the surface of a specially prepared embossing roll. The film may then be pulled over additional rolls. In addition, the film may also be processed through a corona discharge treater similar to the one described earlier. The film web is the processed through the winder where slitting by various cutting techniques may be conducted to reduce the roll width to desired dimensions and wound on cores. This slitting operation may also take place after the film has been wound on film cores.

The film of the present invention can be used in various applications such as bonding dissimilar materials together for automotive interior trim parts such as package tray and visors. Preferably, the film of the present invention is used for preparing headliners.

With reference to FIG. 2, there is shown a laminate structure 20 comprising a film layer of the present invention indicated at 10, a fabric material layer 21, a foam material layer 22 and a shell material layer 23 such as fiberglass wherein the film layer 10 is attached between the foam layer 22 and shell layer 23. In the embodiment shown in FIG. 2, the treated surface 13 of layer 12 is adjacent the foam layer 22 and layer 11 is adjacent the shell layer 23. In another embodiment (not shown) the film 10 can be oriented such that the treated surface of layer 11 can be attached to the shell layer 23 and the layer 11 attached to the foam material layer 22.

At least two processes can be incorporated in using the adhesive film as the bonding layer of dissimilar headliner base substrate and cover materials. First, the film may be applied by an in-mold technique where the film is first placed on the molded base substrate then the cover material placed on top, in the open heated mold. The molding unit is then closed for a specific time until the headliner part has achieved sufficient adhesive bond strength. The mold is then opened and the headliner part is removed and placed in another mold for trimming and other finishing.

This adhesive process may be simplified by mounting the film roll on an unwind stand at the rear of the molding process and unwinding the adhesive film and cover material in unison.

A second process may be used where the adhesive film is preapplied to the foam-backed fabric via a hot roll or flame lamination process. This film, composed of thermoplastic polymers, will first bond to the foam-backed fabric during the pre-application step, resulting in a adhesive, non-tacky polymer coating on the foam. This coated foam-backed fabric is then place in headliner molding unit and processed the same as the previous application, except no additional adhesive film is required. After molding, the headliner part is processed identically as the earlier example.

Example 1

In this Example an adhesive film of the present invention was produced and tested as follows:

A. Adhesive Film Fabrication

A blend of two different thermoplastic ethylene acrylic acid (EAA) resins—the first resin being PRIMACOR TM 3460 EAA resin (Trademark of The Dow Chemical Company) having a melt index of 20 g/10 minutes at a chamber temperature of 190° C. and a force of 2160 grams and the second resin being an PRIMACOR TM 1410XT EAA resin having a melt index of 1.5 g/10 minutes (at same conditions as first resin)—was coextruded with a blend of two different polyethylene resins—the first resin being an ultra linear low density polyethylene (ULLDPE) ATTANE TM 4201 resin (Trademark of The Dow Chemical Company) and the second resin being a low density polyethylene (Dow LDPE 6811 resin). The layer with the ULLDPE resin was surface modified by an electric corona discharge treatment to increase the surface energy of the layer. A cross-sectional view of the resulting structure is shown in FIG. 1. The EAA layer is the major or base layer of this structure with an average layer ratio of 75%.

A silicon dioxide antiblock concentrate was added to the EAA layer in an amount of 1.8% equivalent silicon dioxide and added to the ULLDPE in an amount of 0.9% equivalent silicon dioxide to reduce the tendency of the film surfaces to adhere to each other.

The resulting multilayer film was tested as follows:

B. Film Test Procedures

Film tensile properties of the multilayer film of the present invention were measured using an Instron Universal Tester following the standard testing procedures outlined in ASTM D-882. Film modulus properties of the film were also evaluated using the same Instron Universal Tester instrument following ASTM D-882. Film-to-film heat seal temperature initiation evaluations of the film were made after sealing similar film surfaces at various temperatures for five seconds and 40 psi (0.28 mega Pascals) pressure. One-inch (2.54 centimeters) wide film strips were pulled apart (180 degree pull) at 1 inch per minute (2.54 centimeters/minutes) on the Instron Universal Tester. The temperatures at which 0.25 psi (1700 Pascals) and 1 psi (6900 Pascals) force was required to separate the films were then determined. The adhesive performance tests and results are summarized in the following Table I.

TABLE I

| Test Property | Typical Values |
| --- | --- |
| Ultimate Tensile Strength | 3400 psi (23.3 megapascals) MD |
| | 2900 psi (20.0 megapascals) TD |
| Ultimate Tensile Elongation | 430% MD |
| | 490% TD |
| Tensile Modulus (2% Secant) | 13,000 psi (89.7 megapascals) MD |
| | 14,000 psi (96.6 megapascals) TD |
| Adhesion Bond Temperature | |
| @ 0.25 psi (1700 Pascals) | |
| EAA layer | 165° C. |
| ULLDPE layer | 135° C. |
| @ 1 psi (6900 Pascals) | |
| EAA layer | 175° C. |
| ULLDPE layer | 150° C. |

C. Headliner Fabrication

A production trial was conducted on a blown film line consisting of a two-layer line with 4.5-inch (11.4-centimeter) and 3.5-inch (8.9-centimeter) extruders and an annular 18-inch (46-centimeter) diameter die with a 0.055-inch (0.140-centimeter) gap. EAA 3460 and EAA 1410XT blend plus an antiblock concentrate was added to the 4.5-inch (11.4-centimeter) extruder and the ULLDPE 4201 and LDPE 6811 blend with antiblock was added to the 3.5-inch (8.9-centimeter) extruder. The ULLDPE layer was passed through a corona discharge treated unit and the surface energy increased to 46 dynes/cm.

The addition of EAA 1410XT to the EAA layer stabilized the blown film tube and 2-mil (51-micron) thick film samples were produced for headliner performance trials.

Film rolls were then prelaminated, by flame lamination, to a gray, nylon facing cloth with a 0.150-inch (0.38-centimeter) thick polyether urethane foam backing. The film was successfully flame laminated to this cloth with both a treated ULLDPE layer to the foam (referred to herein as Example 1) and an untreated EAA layer to the foam (referred to herein as Example 2).

The prelaminated film adhesive cloth rolls and a free film (Example 3) roll were trialed on a Chrysler C body headliner platform with a resin impregnated fiberglass shell. Thirty fabrication trials were conducted, changing the free film orientation in the mold (using a 0.070-inch (0.18-centimeter) foam facing cloth) and using both prelaminated headliner cloth samples. Mold processing conditions were varied, with the temperature set points at 320° F. (160° C.) (actual temperatures ranged from 270° F. (130° C.) to 320° F. (160° C.) and mold pressures ranged from 30 psi (0.21 megapascals) to 60 psi (0.42 megapascals). Fabrication closed mold cycle time ranged from 10 seconds to 30 seconds. Mold mechanical stops were removed, air pressure raised and experiments with various shim materials were conducted to determine optimum performance.

D. Headliner Testing

Adhesive bond evaluations of the finished headliner part were performed using several test procedures. Two of these procedures that differentiated film performance were the so-called Initial Bond Strength and Softening Point Test.

The Initial Bond Strength test procedure requires that 1 inch (2.54 centimeters) width samples be cut from the headliner part in both pillowed or low density (low mold pressure) and compressed or high density (high mold pressure) sections of the headliner part. A separation of the foam-backed fabric from the headliner substrate is begun, then the sample is place into the jaws of a tensile testing unit (such as the Instron Universal Tensile Tester). The exposed shell substrate is clamped in the lower jaw and the foam-backed fabric is clamped in the upper jaw, thus creating a 180 degree peel angle. The jaws are then mechanically separated at 12 inches per minute (30.5 centimeters per minute) and the force required to separate the headliner foam-backed fabric from the substrate is measured via a load cell attached to the upper clamp, electrically magnified and processed by a computer to determine actual force required per width of sample. An minimum adhesive bond strength of 0.15 lbs/1 inch width (0.66 Newtons/2.54 centimeter-width) is required to pass this test.

The Softening Point Test was used to simulate adhesive performance at elevated temperatures, with the adhesive bond under stress. In this test, 1 inch (2.54 centimeter) wide samples were placed in an oven at 39° C. A separation of the headliner foam-backed fabric from the substrate was begun and a 50 gram weight was attached to the fabric and hung in a manner to produce a 180° C. peel angle. The temperature of the oven was increased at a given rate and observations of the part were made. The temperature at which the adhesive bond failed was recorded an this temperature was assigned as the Softening Point Temperature. In order to pass this test, an adhesive bond must withstand temperatures of 85° C.

The film sample of Example 1 is the sample with the treated ULLDPE film side to the foam-backed fabric as illustrated in FIG. 2. As FIG. 3 reveals, the prelaminate sample of Example 1 performed the best in the Initial Bond Strength test at all mold cycle times. FIG. 4 details the excellent performance of the prelaminated sample of Example 1, surpassing the minimum 85° C. failure temperature at every mold cycle time.

Example 2

In this example, an adhesive film of the present invention was produced and tested in a similar manner as Example 1.

The prelaminated sample of Example 2 was oriented in the configuration such that the untreated EAA layer of the coextruded film was flame laminated to the foam-backed fabric. The prelaminated sample of Example 2 was process identically to the article in Example 1 and tested in a identical manner. Again in FIG. 3, the performance of this product in the Initial Bond Strength test is above the minimum 0.15 lbs/inch width (0.66 Newtons/2.54 centimeter width). The softening Point Test performance of the sample of Example 2 is revealed in FIG. 4, with the best results of all three samples.

Example 3

In this example, an adhesive film of the present invention was produced and tested in a similar manner as Example 1.

The film sample of Example 3 is a free film, treated surface to the foam-backed fabric. The sample of Example 3 was processed in the headliner molding unit as described in earlier as the in-mold process. In FIG. 3, the Initial Bond Strength of the molded headliner sample is above the 0.15 lbs/inch-width (0.66 Newtons/2.54 centimeter width) minimum at a 15 second mold cycle time. The softening point test at the 15 second mold cycle time is revealed in FIG. 4 and is greater than the 85° C. minimum.

The results of the above examples and other adhesive film trails conducted on different headliner molds and parts show that the film performed just as well or better than alternate adhesive systems. The film of the present invention is novel because it provides for faster headliner closed mold cycle times by employing a lower melting point resin-based layer. A film having too low a melting point will however, not pass the Softening Point Test described above or other climate simulation-/environmental tests as specified by automotive manufacturers.

Employing the EAA resin blend in the film of the present invention was a key to meeting the needs for faster cycle adhesion to the headliner shell (reduced melting point and lower viscosity) while passing environmental tests.

Production runs of the film of the present invention can be successfully accomplished on a coextruded blown film line with processing conditions similar to those described earlier and with typical film physical properties such as found in Table I.

In evaluating the adhesive film of the present invention on various production scale fabrication presses to study performance and processing conditions, it has been observed that the headliner shell-type and properties are the greatest variables in the adhesive performance. Variables in the fiberglass headliner such as silicon release agents, compressed and pillowed areas, and the level of resin impregnation can cause variations in the bond strength. Molding operations, including pressure and temperature variations may also result in inconsistent adhesive performance. Typically, molding machine optimization is a simple process of measuring and adjusting temperatures or increasing mold pressures.

Headliner shell substrates other than fiberglass can also be employed in the present invention with similar results. For example, excellent performance has been demonstrated on paperboard shells at 10 second closed mold cycle times, and in other substrate systems and configurations, as low as five seconds closed mold cycle times.

It has also been found that with varying thickness of the polyurethane foam cover material, foam thickness has a minor impact on performance. Increased foam thickness reduces the heat transfer rate but also slightly increases the molding pressure by adding material to the gap between metal tools.

Headliners with straight deep draw, steep contours and curvatures such as visor and coat hook recesses are the most challenging to form and adhere without wrinkles. Prior art film such as the DAF 899A film has inadequate adhesion and forming performance in these applications.

The foregoing description of preferred embodiments has been set forth merely to illustrate the invention and is not to be limiting. Since modifications of the described embodiments incorporating the spirit and substance of the present invention may occur to persons skilled in the art, the scope of the present invention should be limited solely with respect to the appended claims and equivalents.

What is claimed is:

1. A multi-layer, multicomponent thermoplastic composite adhesive film consisting essentially of:

(a) at least one first layer of a blend of at least two different acrylic acid resins, wherein one of the resins has a melt index of from about 10 g/10 minutes to about 30 g/10 minutes and is present in the blend in an amount of from about 40 weight percent to about 90 weight percent and one of the resins has a melt index of from less than about 5 g/10 minutes and is present in the blend in an amount of from about 40 weight percent to about 90 weight percent; and (b) at least one second layer of a blend of at least two different polyethylene resins selected from the group consisting essentially of ultra linear low density polyethylene, linear low density polyethylene, and low density polyethylene, said second layer adjacent and contiguous to the first layer.

2. The film of claim 1 wherein the at least one second layer comprises a blend of ultra linear low density polyethylene having a melt index of less than about 10 g/10 minutes in an amount of from about 75 weight percent to 95 weight percent and low density polyethylene having a melt index from about 0.1 g/10 minutes to about 10 g/10 minutes in an amount of from about 5 weight percent to 25 weight percent.

3. The film of claim 2 wherein the ultra linear low density polyethylene has a density of less than about 0.915 g/cc.

4. The film of claim 2 wherein the low density polyethylene has a density of from about 0.916 g/cc to about 0.930 g/cc.

5. The film of claim 1 wherein the acrylic acid resins in said at least one first layer are ethylene acrylic acid resins.

6. The film of claim 1 wherein the surface of layer (b) is modified by an electronic corona discharge treatment to increase the surface energy of layer (b).

7. The film of claim 1 wherein layer (a) is the major layer with an average layer ratio of from about 60 to about 90 percent.

8. The film of claim 1 wherein a silicon dioxide antiblock concentrate is added to at least one layer of the multilayer film to reduce the tendency of the film surfaces to adhere to each other.

9. A composite laminate structure comprising a substrate adhered to a multilayer, multi-component thermoplastic composite adhesive film consisting essentially of:

(a) at least one first layer of a blend of at least two different acrylic acid resins, wherein one of the resins has a melt index of from about 10 g/10 minutes to about 30 g/10 minutes and is present in the blend in an amount of from about 40 weight percent to about 90 weight percent and one of the resins has a melt index of from less than about 5 g/10 minutes and is present in the blend in an amount of from about 40 weight percent to about 90 weight percent; and (b) at least one second layer of a blend of at least two different polyethylene resins selected from the group consisting essentially of ultra linear low density polyethylene, linear low density polyethylene, and low density polyethylene, said second layer adjacent and contiguous to the first layer.

10. A composite structure comprising a structural shell material attached to a foam material by a multilayer, multi-component thermoplastic composite adhesive film consisting essentially of:

(a) at least one first layer of a blend of at least two different acrylic acid resins, wherein one of the resins has a melt index of from about 10 g/10 minutes to about 30 g/10 minutes and is present in the blend in an amount of from about 40 weight percent to about 90 weight percent and one of the resins has a melt index of from less than about 5 g/10 minutes and is present in the blend in an amount of from about 40 weight percent to about 90 weight percent; and (b) at least one second layer of a blend of at least two different polyethylene resins selected from the group consisting essentially of ultra linear low density polyethylene, linear low density polyethylene, and low density polyethylene, said second layer adjacent and contiguous to the first layer.

11. A process for preparing a multi-layer, multi-component thermoplastic composite adhesive film comprising the step of laminating:

(a) at least one first layer of a blend of at least two different acrylic acid resins, wherein one of the resins has a melt index of from about 10 g/10 minutes to about 30 g/10 minutes and is present in the blend in an amount of from about 40 weight percent to about 90 weight percent and one of the resins has a melt index of from less than about 5 g/10 minutes and is present in the blend in an amount of from about 40 weight percent to about 90 weight percent; and (b) at least one second layer of a blend of at least two different polyethylene resins selected from the group consisting essentially of ultra linear low density polyethylene, linear low density polyethylene, and low density polyethylene, said second layer adjacent and contiguous to the first layer.

12. The process of claim 11 including modifying the surface of layer (b) by an electronic corona discharge treatment to increase the surface energy of layer (b).

13. A process for preparing a composite laminate structure comprising the step of laminating:

(i) a multi-layer, multi-component thermoplastic composite adhesive film consisting essentially of:

(a) at least one first layer of a blend of at least two different acrylic acid resins, wherein one of the resins has a melt index of from about 10 g/10 minutes to about 30 g/10 minutes and is present in the blend in an amount of from about 40 weight percent to about 90 weight percent and one of the resins has a melt index of from less than about 5 g/10 minutes and is present in the blend in an amount of from about 40 weight percent to about 90 weight percent; and (b) at least one second layer of a blend of at least two different polyethylene resins selected from the group consisting essentially of ultra linear low density polyethylene, linear low density polyethylene, and low density polyethylene, said second layer adjacent and contiguous to the first layer; and (ii) a substrate.

* * * * *